Sept. 28, 1971 R. E. DUNIPACE 3,608,146
APPARATUS FOR FORMING PLASTIC TUBULAR ARTICLES
Filed April 22, 1968 6 Sheets-Sheet 1

INVENTOR.
RUSSELL E. DUNIPACE
BY W. A. Schaich &
E. J. Holler
ATTORNEYS

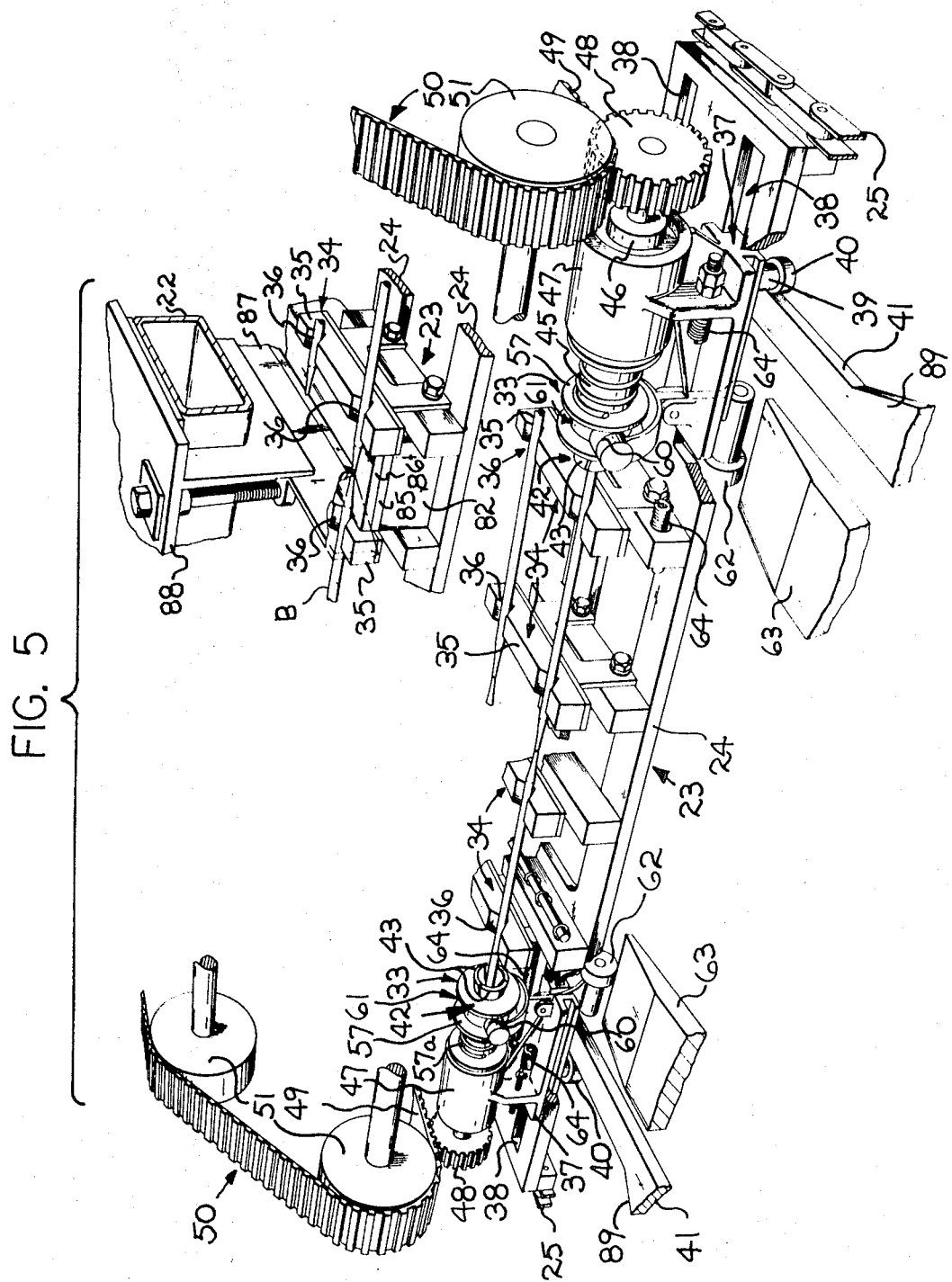

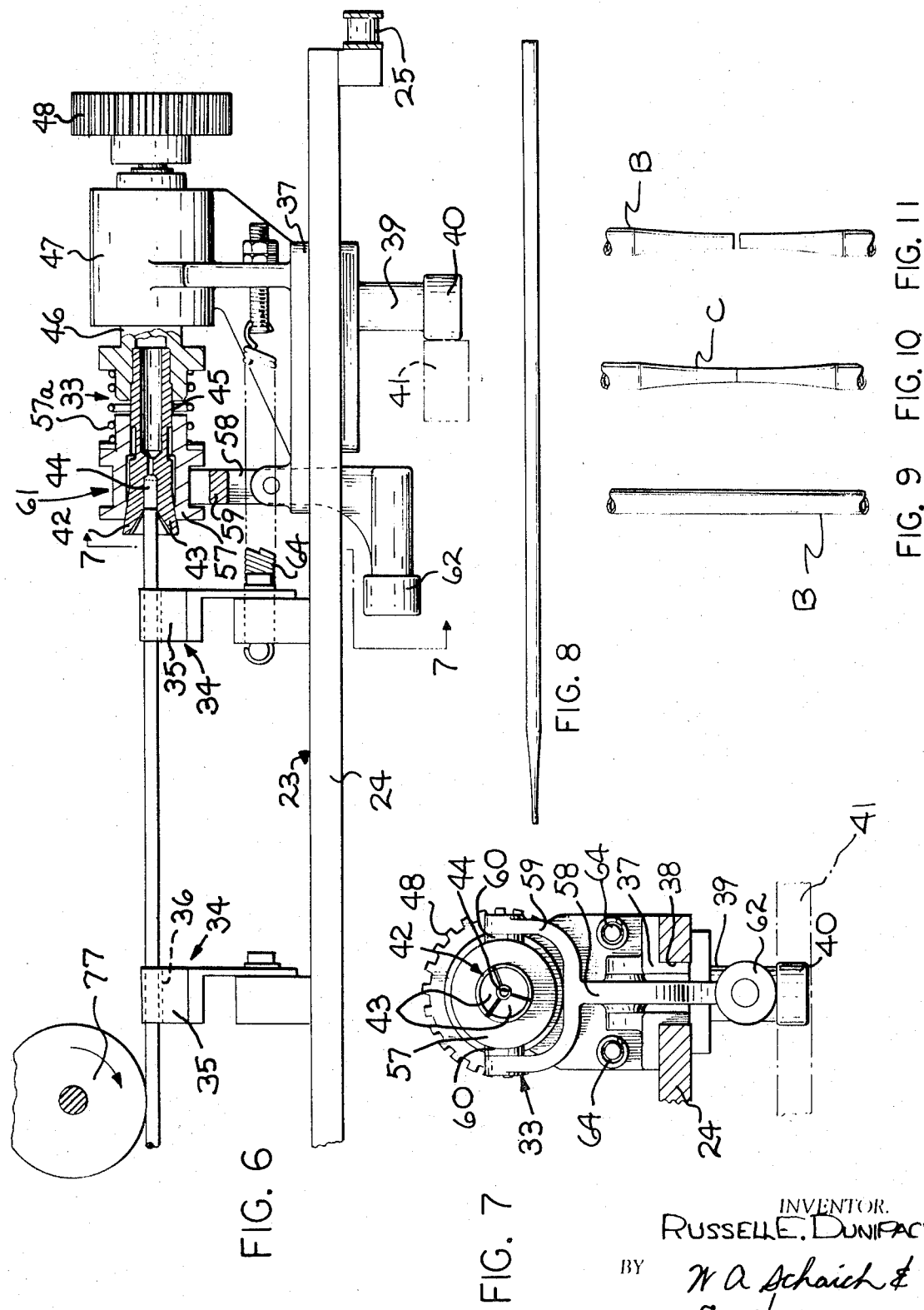

United States Patent Office 3,608,146
Patented Sept. 28, 1971

3,608,146
APPARATUS FOR FORMING PLASTIC TUBULAR ARTICLES
Russell Eugene Dunipace, Perrysburg, Ohio, assignor to Owens-Illinois, Inc., Toledo, Ohio
Filed Apr. 22, 1968, Ser. No. 723,351
Int. Cl. B29c 17/02, 17/10, 17/14
U.S. Cl. 18—19TM 9 Claims

ABSTRACT OF THE DISCLOSURE

The present disclosure relates to apparatus and method for conveying and transforming tubular thermoplastic blanks into tubular pipets, medicine droppers, burette points, ampuls, and the like, while advancing continuously along a prescribed path. The disclosure has particular utility in forming disposable pipets made of thermoplastic material such as polystyrene and the like.

BACKGROUND OF THE INVENTION

This invention relates to apparatus and method for forming plastic pipets and similar items of scientific and laboratory ware from tubular blanks.

More particularly, this invention relates to apparatus and method for forming a pair of similar, if not identical, pipets from a single length or blank of thermoplastic tubing of uniform dimensions, by heating to a soft deformable state, a medial portion of the blank and elongating such heat-softened portion axially thereby to form a localized area of reduced cross-section, which area upon cooling is severed medially of its length to form a tapered delivery or discharge end on each of two similarly-shaped pipets.

Heretofore, it has been conventional practice to form glass pipets from lengths of glass tubing during their conveyance in succession in transverse array in either horizontal or inclined planes by various types of conveyor apparatus. The tubular blanks are either continuously moved along a prescribed path through various forming stations or, alternatively, the conveyor for the blanks is periodically stopped to deliver the blanks, at indexed intervals, to prescribed working locations and devices. In the forming of essentially straight-sided elongated glass pipets, the blanks have been either moved continuously or intermittently through a series of working stations while resting upon the upper reach of the conveyor mechanism of the forming machine. The inherent rigidity of glass blanks permits their being worked while simply resting upon the upper reach of the conveyor means, thereby to form a pair of similar pipets from a single tubular glass blank. A medial region of the glass blanks may be heat-softened and stretched by contacting the sides of the blanks, the medial region of reduced cross-section then being separated by a scoring and/or thermal shocking operation. Apparatus which has previously been employed in manufacturing pipets having constant volume bulbs is disclosed and claimed in U.S. Patent No. 3,309,188, issued Mar. 18, 1967. Also, various other apparatus for performing work on glass tubes and vials is disclosed in U.S. Patents Nos. 3,170,782, 3,257,186 and 2,878,619, all of which are assigned to the same parent assignee as the present application.

It must be recognized that due to the inherent rigidity of tubular glass blanks, work thereon may efficiently be conducted by simply contacting the sides of the workpieces to rotate the same while passing through a series of forming stations.

The problems inherent in producing a pair of disposable plastic pipets from a single length of plastic tubing are considerably different from those experienced in glass working. It is extremely important that precise uniformity in the produced pipets be achieved to ensure a high quality product. The tendency of such plastic tubing blanks to bow out of axial alignment when subjected to various forming operations is a serious problem requiring positive retention of the workpiece. It is common practice in the use of such pipets to employ the same for a single-type or standardized operation, or analysis, and then dispose of same. This is particularly true in the use of such pipets in pathological laboratories, the "one-use" pipets being disposable to eliminate the practice of washing and autoclaving to re-establish their sterility. The precision of such end-use application requires that the pipets be precisely alike in size and dimensions, and have comparable fluid delivery times, thus requiring accurate control of the formation of their delivery tips. Thus, the tubular blanks of thermoplastic material such as polystyrene, polyethylene, polypropylene, and the like, from which such pipets may be economically made, are not normally sufficiently rigid to permit precision forming while resting on a conveyor upper reach. It is to overcome the inherent deficiencies in forming such materials that the present invention is directed.

SUMMARY OF THE INVENTION

Accordingly, it is an object of the present invention to provide novel apparatus adapted to continuously convey a series of plastic tubular blanks through a series of forming stations, the tubes being firmly constrained at their ends and positively rotated during a major segment of the forming operation.

Another object of the present invention is to provide apparatus for continuously conveying a series of tubular blanks of synthetic thermoplastic material along a lineal path with axes of the blanks disposed normal to their path of travel and in recumbent position, while positively retaining and axially rotating the blanks throughout their transport through a series of forming stations.

Another object of this invention is to provide apparatus and method for forming similarly-shaped plastic pipets having precisely-contoured delivery tips, a pair of articles being made from a single tube-like blank, while transporting the blank through heat-softening, stretching and severing stations to form pipets having matched delivery tips and overall lengths.

A further object of this invention is to provide a novel method for forming pairs of pipets from tubular plastic blanks which are retained at their ends, axially rotated, medially heat-softened, stretched and separated as they are continuously and sequentially processed.

A still further object of this invention is the provision of a novel method of forming precisely-contoured pairs of disposable plastic pipets from tubular blanks whereby the blank is medially heat-softened and longitudinally pulled by end-grasping devices to form a restricted region which, upon cooling, is subsequently separated by shearing.

Other objects will be in part apparent and in part pointed out hereinafter.

BRIEF DESCRIPTION OF THE DRAWINGS

In the accompanying drawings forming a part of this application:

FIG. 5 is a fragmentary detail perspective view of the delivery end of the apparatus, showing finished pipets about to be discharged, the scoring device also being shown.

FIG. 6 is a fragmentary detail sectional elevational view showing one of the blank chucks and the roller means for axially moving a blank into contact with the chuck socket recess bottom.

FIG. 7 is a sectional elevational view taken substantially along the line 7—7 of FIG. 6.

FIG. 8 is an elevational view of a completed pipet.

FIGS. 9, 10 and 11 show the successive stages through which each blank passes; FIG. 9 showing the medial portion which is heat-softened; FIG. 10 showing this portion elongated axially to reduce its diameter and taper same; and FIG. 11 showing the softened portion severed medially to divide the blank in half and thus produce two similar pipets, each having a tapered delivery tip or discharge end.

Figure 1:
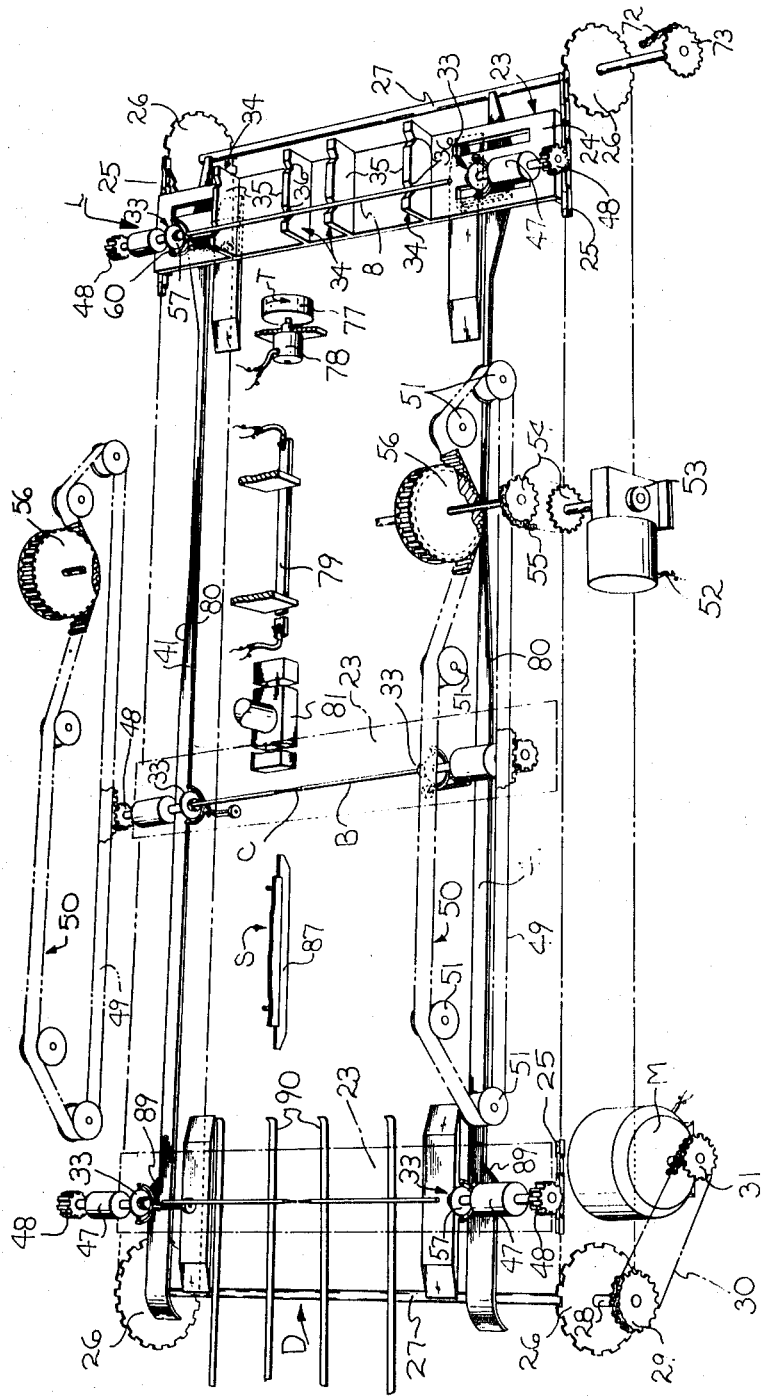
FIG. 1 is a schematic perspective view showing the general relationship of the basic elements of the apparatus, portions being omitted in the interest of clarity.

In the illustrated embodiment of the present invention, it comprises an elongated horizontal frame 20 and supporting posts 21 for the latter. This frame 20 includes cross-bars 92, which, as will be evident presently, in part support much of the fabricating mechanism, yet to be described. The general arrangement is perhaps best indicated in FIG. 1, such comprising an endless series of pipet blank carriers 23 in the form of elongated plates 24 which extend transversely across the frame, with their ends secured to a pair of driven endless chains 25. These chains are trained over sprockets 26 which are carried by horizontal cross-shafts 27 at opposite ends of the frame 20. One of these shafts has an end 28 extended beyond the adjacent sprocket 26, such end carrying a small sprocket 29 over which is trained a chain 30, the latter being also trained over a sprocket 31 driven by an electric motor M, or the like power plant. Advance of the upper reach of the chains 25 transports tube-like thermoplastic pipet blanks B from a loading station L at the right-hand end of FIG. 1 to a discharge or delivery station D at the opposite end of FIG. 1. At predetermined points, or stations, between said stations L and D, the blanks are worked upon so that upon reaching the delivery station D, each blank will have become two separate, axially aligned pipets of substantially, if not identical, length and wherein each such pipet has a tapered delivery tip, as perhaps is best shown in FIG. 8. Because the creation of axial discharge openings in these tips result solely from transverse severance of the constricted area C of the blank B (FIGS. 5, 10 and 11), these openings will be of the same diameter and as a consequence, the liquid delivery rate for the resultant two pipets, of necessity, will be identical, as is evidenced and desired.

Figure 3:
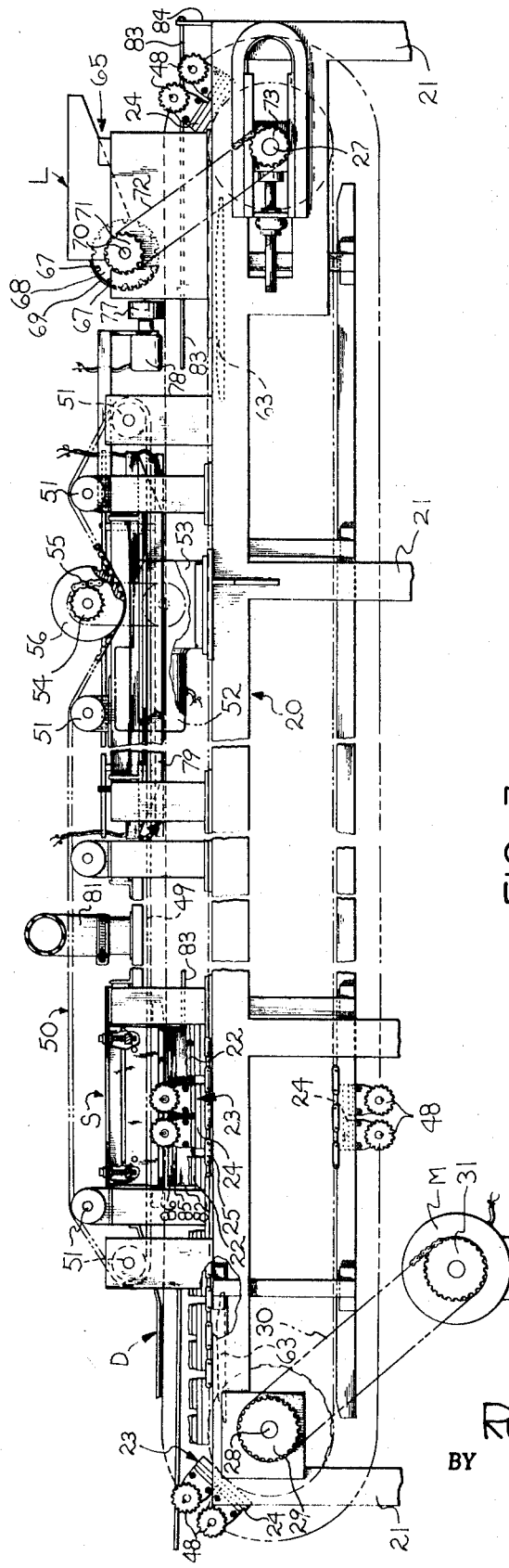
FIG. 3 is a side elevational view with parts in section.

Each of the aforementioned blank carrier plates 24, preferably, though not necessarily, is wide enough to accommodate two pairs of rotatable blank chucks 33, each pair being coaxial and aligned with intermediate rests 34 for the tubular blanks B. These rests may well be in the form of transverse bars 35 attached to the upper side of the carrier plate 24 and provided with upwardly facing channels 36 or notches to receive the blanks. These rests preferably are formed of nylon, or similar material, which will not scuff or otherwise mar the plastic blanks. With the exception of FIG. 3, only one pair of chucks 33 appear on each carrier plate 24, in the interest of clarity.

Each such chuck 33 (FIGS. 5, 6 and 7) is mounted upon a longitudinal slide 37 riding in a slide-way 38 adjacent an end of the carrier plate 24. A depending finger 39 carries a cam roll 40 which is movable by means of a fixed cam 41, in a manner to be explained, for shifting the chuck axially. A split chuck socket 42 comprising contractible jaws 43 shaped to create a blank-end receiving recess 44 has a rearward axial extension 45 carried by and coaxial with a stub-shaft 46 journaled in a bearing 47 which is mounted upon the slide 37. A driven pinion 48 is secured to this shaft 46 and at times meshes with the lower reach 49 of a toothed drive belt 50 (FIG. 6) for the purpose of rotating the chucks 33 at proper times. This belt 50 is trained over a series of idler pulleys 51 and is driven by a motor 52 operating through a speed reducer 53, sprockets 54 and chain 55 and a toothed wheel 56 or gear which runs in mesh with the toothed belt 50. Referring back to FIGS. 6 and 7, the split chuck jaws 43 normally are contracted to a blank-end grasping relationship by means of a collar 57 or collet encircling the chuck jaws which are externally tapered longitudinally so that the collar 57 under axial pressure of the coil expansion spring 57a urges this collar toward the open end of the chuck socket 42 to close such jaws 43. A cam-actuated bell-crank lever 58 pivoted to and carried by the slide 37 (FIGS. 5 and 6) includes a yoke 59 straddling the collet, with rolls 60 riding in a circumferential external channel 61 in said collet. A cam roll 62 at the lower free end of this lever 58 at times engages a fixed cam 63 when it is necessary to open the chuck sockets to admit or release blanks and/or finished pipets, as will appear presently. Coil pull springs 64 yieldingly hold the chucks in such position that the cam 41 may effectively determine the various positions of these chucks during each cycle of operation.

Figure 2:
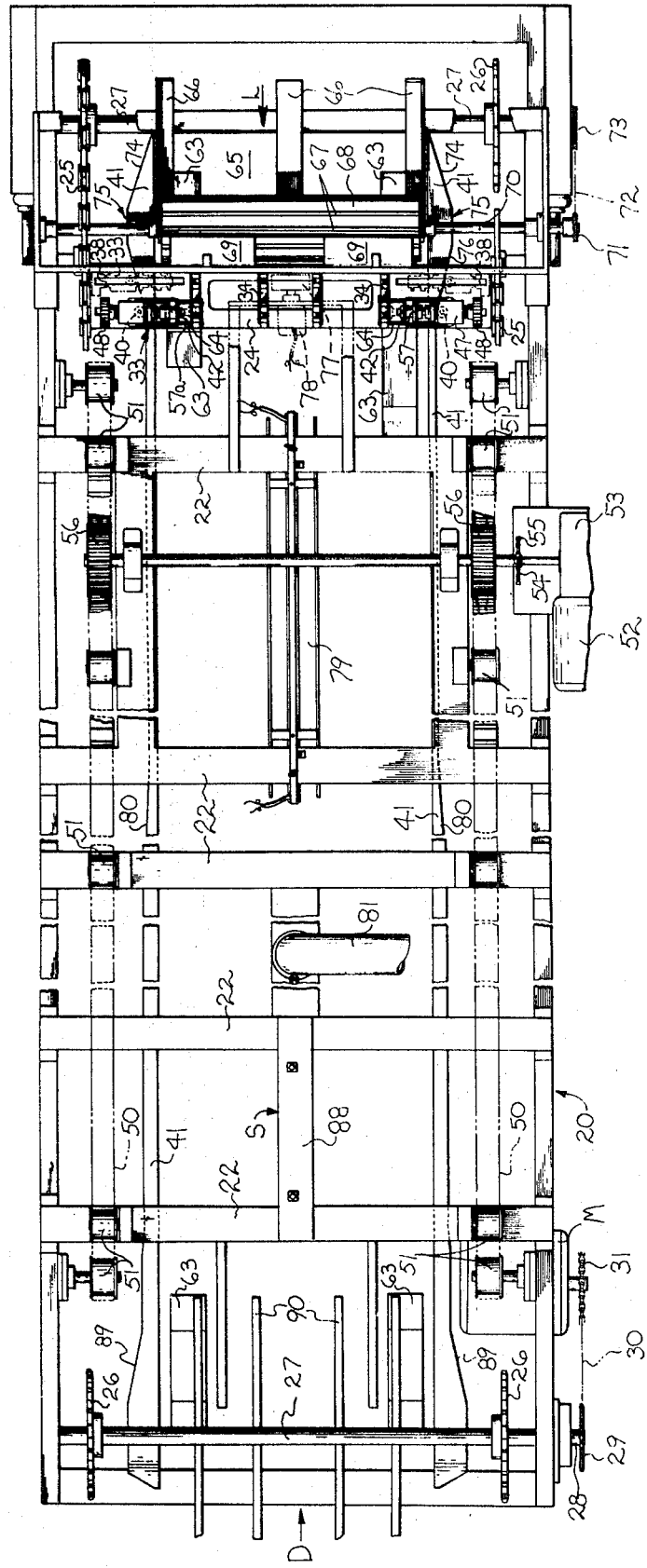
FIG. 2 is a top plan view of the apparatus, again with portions of some elements omitted in the interest of clarity.
Figure 4:
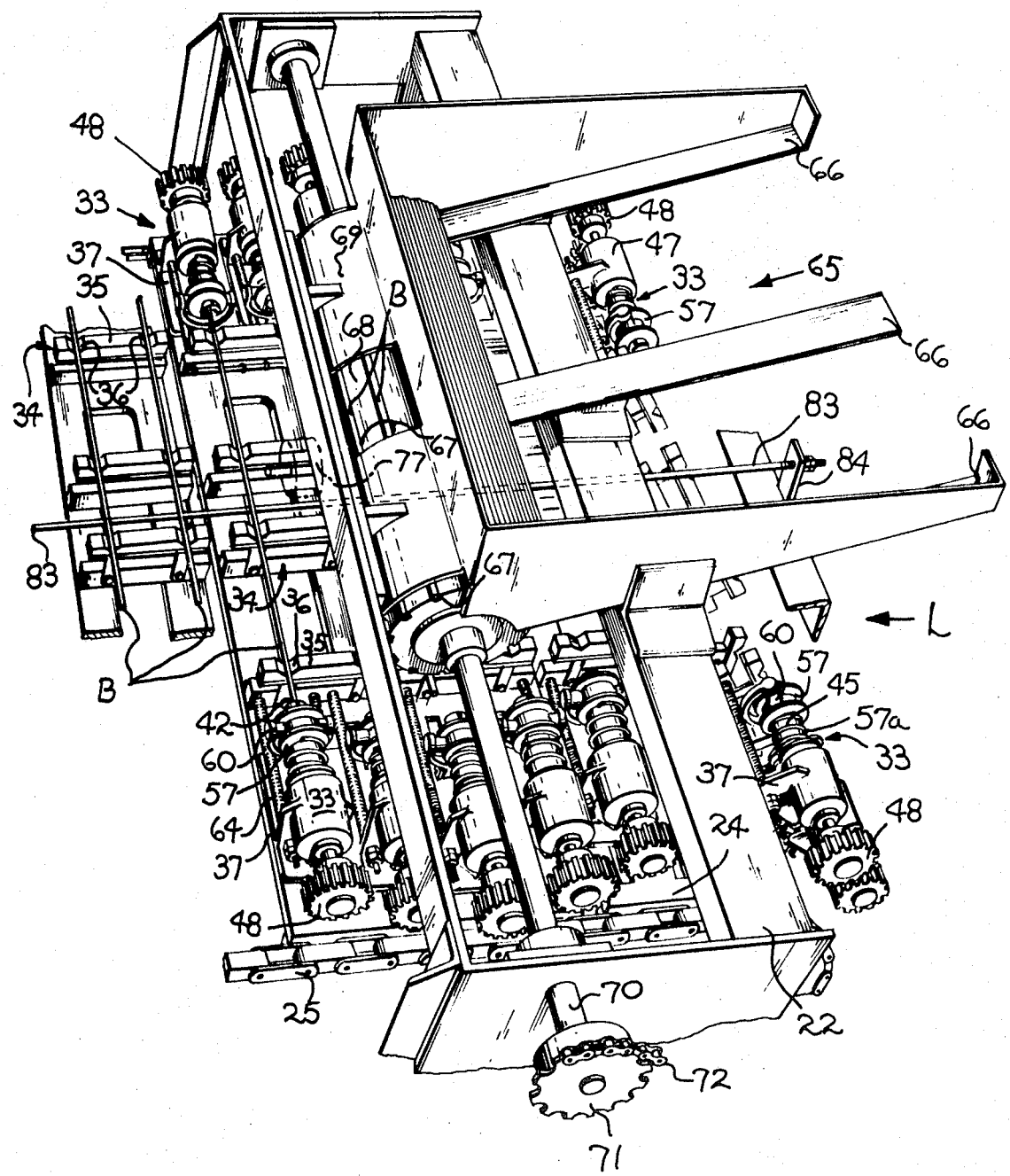
FIG. 4 is a detail fragmentary perspective view of the blank loading end of the apparatus.

Pipet blanks B in the form of predetermined lengths of thermoplastic tubing are placed in a loader 65 (FIGS. 2, 3 and 4) so that they are in recumbent positions in bundle formation and supported on inclined tracks 66 from the lower end of which these blanks fall one at a time, by gravity, into longitudinal channels 67 or grooves in the periphery of a transfer drum 68. A hood 69 confines the blanks in the channels until their arrival at the extreme lower side of the drum where the hood terminates, allowing the blanks to drop onto the rests 34. The channels 67 in the drum are spaced apart the same distance as the notches 36 in the rests 35, to insure proper loading. The transfer drum 68 is mounted upon a horizontal shaft 70, one extended end of which carries a sprocket 71 connected by a chain 72 to a sprocket 73 which is mounted on an end of the adjacent shaft 27. At the time the blanks are seated in the notches 36, they become substantially axially aligned with the recesses 44 of a pair of opposed chuck sockets 42. At the time of deposit of a blank B in the rest notches 36 (FIGS. 1, 2 and 4), the corresponding chucks 33 are retracted as a result of the cam rolls 40 having moved along the slope 74 of the cams 41 (FIGS. 2 and 6), to the flat area 75 along which the rolls ride as the blanks move from the drum to the rests 35. Subsequent to such placement of a blank upon a set of aligned rests, the cam rolls advance along the cam slope 76 thereby allowing the pull-springs 64 to shift the two opposed chucks 33 axially inward and position the blank-ends in the chuck socket recesses 44. At this point, a rotating overhead roller 77 formed of rubber or some similar material and driven by a motor 78 momentarily contacts the upper side of the blank B (FIGS. 1-4 and 6) for the purpose of moving the blank axially its limit into one of the chuck socket recesses 44, preferably, though not necessarily, the uppermost chuck shown in FIGS. 1, 2 and 4). Cams 63 (FIGS. 1 and 3) at the loading end operate through the levers 58 to hold the chuck sockets open while the chucks move toward each other thereby to position the blank ends in the socket recesses 44. It will be observed (FIG. 2) that the upper of the two cams 63 terminates ahead of the lower cam 63 so that the upper chuck socket 42 grasps the adjacent blank end prior to chuck-gripping of the other end of the blank B. Almost immediately following such grasping of the upper end (FIG. 2), the adjacent pinion 48 meshes with the toothed drive belt 50, thereby initiating rotation of the upper chuck 33 and the blank B. Shortly thereafter, the lower cam 63 terminates, allowing the adjacent chuck socket to grasp the adjacent end of the blank and concurrently therewith, the pinion 48 of this lower chuck meshes with and is rotated by a second toothed drive belt 50. With both ends of the blank thus firmly chucked and rotating on the common axis of the blank and chucks, they advance with the carrier plate 24 so as to move the medial portion of the blank beneath and quite close to a ribbon-type electric heater 79 (FIGS. 1 and 2) which softens the plastic material in this portion to such degree that it can be stretched and reduced diametrically to create a double taper (FIGS. 1, 10 and 11) incident to moving apart axially of the two chucks 33 by the cam slope 80 of cams 41.

Between this blank stretching zone and a blank scoring zone S, the constricted medial portion may cool naturally in the open atmosphere, or if preferred, cooling may be accelerated by cooling means 81. In the scoring zone S (FIGS. 1, 3 and 5), the scoring mechanism comprises a floating anvil 82, or base, resting upon a pair of the crossbars 22 and connected to one end of a horizontal rod 83 (FIGS. 3 and 4) which extends to the loading end L of the apparatus where it is anchored to a bracket 84. A facing comprising a strip 85 of polyurethane foam, to create a cushion, and a top strip 86 of Teflon, is mounted upon the base 82. A scoring blade 87 extends lengthwise of the apparatus, just above the anvil 82, such blade being suspended from a holder 88 which is capable of adjustment along a pair of the cross-bars 22 in order to change the precise point of scoring the constricted area of the blank as determined by the transverse location of the chucks 33 which first grasp an end of the blanks. Thus, it is seen that the bottom end of the socket recesses 44 of these particular chucks (those at the left side of FIG. 5, for example) constitute a reference point for the scoring blade setting. This blade may have at least its inlet end inclined to facilitate entry of blanks into the scoring zone S.

Upon completion of the scoring operation, the blank advances toward the discharge station D and during such advance, the chucks 33 are moved apart axially by the offset 89 of the cam 41. Thus, the blank is pulled axially to separate it into two separate completed pipets. Thereupon the chucks are opened by means of the cams 63, releasing the pipets so they may roll down tracks 90, or be removed in any other preferred manner.

Returning to the initial chucking of the blanks B, it should be explained that the upper cam 41 (FIG. 2) which determines the axial position of the adjacent chuck 33 functions immediately following chucking of both ends of the blank B, to move the first closed chuck so as to place the blank under slight axial tension. Thus the blank is held axially straight against any possible bowing and/or whipping action incident to rotation with the chucks. Plastic tubes have such tendency in varying degrees as determined by wall thickness and/or composition.

Modifications may be resorted to within the spirit and scope of the appended claims.

What is claimed:

1. Apparatus for forming a pair of pipets from a blank in the form of a length of thermoplastic tube comprising,
    a pair of coaxial chucks one at each side of a horizontal path of travel of the blank, there being a blank loading station at one end of said path and a finished pipet delivery station at the other end of said path,
    a blank rest between and coaxial with the chucks,
    means at the loading station for placing a blank upon the blank rest with its axis substantially in register with the chucks' axes,
    means for moving the pair of chucks axially to enclose the ends of the blank,
    means for axially moving the blank its limit into one of the pair of chucks,
    means causing the said one chuck to grasp the adjacent end of the blank,
    separate means then operable to cause the other chuck to grasp the opposite end of the blank,
    means for rotating the pair of chucks and grasped blank on the latter's axis while advancing the blank through successive heating and scoring zones,
    means in the heating zone for softening the medial portion of the blank,
    means for moving the chucks apart to stretch and diametrically reduce the softened medial portion of the blank,
    means in the scoring zone for scoring the softened medial portion of the blank, such scoring means including a supporting anvil for supporting the medial portion of the blank, a scoring blade overlying the supporting anvil for scoring the medial portion of the blank,
    means for adjusting the scoring blade in a direction normal to the path of travel of the blank and in reference to the said one chuck whereby to so locate the scoring blade as to ensure uniform length pipets,
    means for further separating the chucks to thereby separate the blank at the score and provide a pair of pipets,
    and means for opening the chucks to release the pair of completed pipets.

2. Apparatus as defined in claim 1, wherein the pair of coaxial chucks are independently operable to grasp respective adjacent ends of the blank in sequential order.

3. Apparatus as defined in claim 1, wherein the heating means for softening a medial portion of the blank comprises an electrical, resistance-type strip heater mounted in the heating zone along the path of travel and adjacent to the medial portion of the blank.

4. Apparatus as defined in claim 1, wherein the means for moving the chucks apart to stretch and diametrically reduce the softened medial portion of the blank comprises cam means for axially shifting the pair of chucks apart under a cam controlled rate and extent.

5. Apparatus as defined in claim 1, wherein the scoring blade comprises a knife blade mounted parallel to the path of travel of the blank and in position to intercept the rotating diametrically reduced medial portion of the blank.

6. Apparatus as defined in claim 1, wherein the pair of coaxial chucks are mounted in juxtaposed alignment on an elongated unitary support member, and wherein the means for rotating the pair of chucks comprises pinions individual to each of the pair of chucks and respectively engageable with a chain-drive mechanism disposed along each side of the path of travel of the blank.

7. Apparatus as defined in claim 1, wherein the means for placing a blank upon the blank rest includes automatic loading means for storing, orienting and sequentially delivering a plurality of blanks in a recumbent position disposed axially normal to the ensuing path of travel of the blank through the heating and scoring zones.

8. Apparatus as defined in claim 1, including means operable to move one of the pair of chucks axially relative to the other to place the blank under axial tension following grasping of each end of the blank by the pair of chucks.

9. Apparatus as defined in claim 1, wherein the movements of the pair of chucks, the blank rest and the blank are duplicated by a plurality of substantially identical pairs of chucks, blank rests and blanks comprising the apparatus which are arranged and coordinated to move in continuous succession and thereby continuously form successive pairs of completed pipets.

References Cited

UNITED STATES PATENTS

| | | | |
|---|---|---|---|
| 1,646,498 | 10/1927 | Seede | 18 (Electric heating) |
| 1,999,751 | 4/1935 | Clayton | 18 (Electric heating) |
| 2,125,017 | 7/1938 | Halversen | 65—174 |
| 2,523,006 | 9/1950 | Gaskill et al. | 65—174 |
| 2,763,098 | 9/1956 | Pennybacker et al. | 65—227X |
| 2,829,398 | 4/1958 | Carpenter et al. | 146—159X |
| 2,835,079 | 5/1958 | Carorata et al. | 65—174 |
| 3,170,782 | 2/1965 | Koenig | 65—227 |
| 3,457,589 | 7/1969 | Gordon | 18—1FB |

J. SPENCER OVERHOLSER, Primary Examiner

R. L. SPICER, JR., Assistant Examiner

U.S. Cl. X.R.

18—Dig. 53; 65—109, 174; 225—96.5

UNITED STATES PATENT OFFICE
CERTIFICATE OF CORRECTION

Patent No. 3,608,146　　　　　　　　　　Dated September 28, 1971

Inventor(s) Russell Eugene Dunipace

It is certified that error appears in the above-identified patent and that said Letters Patent are hereby corrected as shown below:

Col. 3, line 38, "92" should be --22--. Col. 8, line 3, "Carorata" should be --Camarata--.

Signed and sealed this 26th day of June 1973.

(SEAL)
Attest:

EDWARD M. FLETCHER, JR.　　　　　　　ROBERT GOTTSCHALK
Attesting Officer　　　　　　　　　　Commissioner of Patents